(12) United States Patent
Hosek

(10) Patent No.: US 11,268,630 B2
(45) Date of Patent: Mar. 8, 2022

(54) DIRECT-DRIVE FLEXURE-MECHANISM VACUUM CONTROL VALVE

(71) Applicant: Persimmon Technologies, Corp., Wakefield, MA (US)

(72) Inventor: Martin Hosek, Lowell, MA (US)

(*) Notice: Subject to any disclaimer, the term of this patent is extended or adjusted under 35 U.S.C. 154(b) by 0 days.

(21) Appl. No.: 16/533,119

(22) Filed: Aug. 6, 2019

(65) Prior Publication Data

US 2020/0049278 A1 Feb. 13, 2020

Related U.S. Application Data

(60) Provisional application No. 62/715,466, filed on Aug. 7, 2018.

(51) Int. Cl.

| *F16K 31/06* | (2006.01) |
|---|---|
| *F16K 51/02* | (2006.01) |
| *F16K 3/10* | (2006.01) |
| *F16K 31/04* | (2006.01) |
| *F16K 3/14* | (2006.01) |
| *F16K 3/12* | (2006.01) |
| *F16K 37/00* | (2006.01) |

(52) U.S. Cl.
CPC ............... *F16K 51/02* (2013.01); *F16K 3/10* (2013.01); *F16K 3/12* (2013.01); *F16K 3/14* (2013.01); *F16K 31/04* (2013.01); *F16K 31/0658* (2013.01); *F16K 31/0693* (2013.01); *F16K 37/0033* (2013.01); *F16K 37/0041* (2013.01)

(58) Field of Classification Search
CPC ...... F16K 3/0218; F16K 3/0245; F16K 31/04; F16K 31/0655; F16K 31/0658; F16K 31/0679; F16K 31/10; F16K 41/12; F16K 51/02
USPC ........ 251/129.07, 129.1, 129.11–13, 129.16, 251/319
See application file for complete search history.

(56) References Cited

U.S. PATENT DOCUMENTS

| 3,570,806 | A | * | 3/1971 | Sturman | ............... F16K 31/082 251/65 |
|---|---|---|---|---|---|
| 3,606,241 | A | * | 9/1971 | Bornholdt | ............... H01F 7/088 251/52 |
| 3,635,438 | A | | 1/1972 | Peters | |
| 4,463,332 | A | * | 7/1984 | Everett | ................. H01F 7/1615 335/258 |
| 4,550,749 | A | | 11/1985 | Krikorian | |

(Continued)

*Primary Examiner* — Matthew W Jellett
(74) *Attorney, Agent, or Firm* — Harrington & Smith

(57) ABSTRACT

A valve including a first member including a fluid flow aperture therethrough; a second member movably connected to the first member between an open position and a closed position relative to the fluid flow aperture; at least one electromagnetic actuator connected between the first member and the second member, where the at least one electromagnetic actuator is configured to move the second member between the open position and the closed position, where the at least one electromagnetic actuator includes a first electromagnetic actuator having a stationary portion connected to the first member and a movable portion connected to the second member; and at least one mechanical flexure connected between the first member and the movable member of the actuator, where the at least one mechanical flexure constrains motion of the movable member to along a substantially straight line.

21 Claims, 3 Drawing Sheets

(56) References Cited

U.S. PATENT DOCUMENTS

| | | | | |
|---|---|---|---|---|
| 4,606,502 | A | * | 8/1986 | Naschberger ........... B05B 12/00 |
| | | | | 239/583 |
| 4,767,097 | A | * | 8/1988 | Everett ............... F16K 31/0665 |
| | | | | 251/129.08 |
| 5,108,071 | A | * | 4/1992 | Hutchings ........... F16K 31/0665 |
| | | | | 251/129.08 |
| 5,560,586 | A | * | 10/1996 | Aruga ..................... F16K 31/04 |
| | | | | 251/129.11 |
| 6,047,673 | A | | 4/2000 | Lohse et al. |
| 6,089,537 | A | | 7/2000 | Olmsted |
| 6,260,522 | B1 | | 7/2001 | Stolk et al. |
| 6,994,311 | B2 | | 2/2006 | Duelli et al. |
| 7,500,649 | B2 | * | 3/2009 | Litscher ................ F16K 3/0254 |
| | | | | 251/326 |
| 9,149,936 | B2 | | 10/2015 | Hosek et al. |
| 9,429,248 | B2 | * | 8/2016 | Merry ..................... F16K 51/00 |
| 9,502,952 | B2 | | 11/2016 | Hofmeister |
| 9,530,623 | B2 | * | 12/2016 | Merry ..................... F16K 31/00 |
| 10,224,232 | B2 | | 3/2019 | Hosek |
| 10,269,604 | B2 | | 4/2019 | Hofmeister et al. |
| 2017/0356569 | A1 | | 12/2017 | Netzer et al. |

\* cited by examiner

DIRECT-DRIVE FLEXURE-MECHANISM VACUUM CONTROL VALVE

CROSS-REFERENCE TO RELATED APPLICATION

This application claims priority under 35 USC 119 to U.S. provisional application No. 62/715,466 filed Aug. 7, 2018 which is hereby incorporated by reference in its entirety.

BACKGROUND

Technical Field

The example and non-limiting embodiments relate generally to a valve.

Brief Description of Prior Developments

Vacuum control valves are used in semiconductor processing tools to gradually open and close a flow path between a process chamber and a vacuum pump for the purpose of controlling the pressure in the process chamber. Various vacuum control valve architectures are known in the state of the art including pendulum designs, such as described in U.S. Pat. No. 6,089,537 which is hereby incorporated by reference in its entirety, and poppet designs, such as described in U.S. Pat. No. 6,994,311 which is hereby incorporated by reference in its entirety.

SUMMARY

The following summary is merely intended to be exemplary. The summary is not intended to limit the scope of the claims.

In accordance with one aspect, an example embodiment is provided in a valve comprising: a first member comprising a fluid flow aperture therethrough; a second member movably connected to the first member between an open position and a closed position relative to the fluid flow aperture; at least one electromagnetic actuator connected between the first member and the second member, where the at least one electromagnetic actuator is configured to move the second member between the open position and the closed position, where the at least one electromagnetic actuator comprises a first electromagnetic actuator comprising a stationary portion connected to the first member and a movable portion connected to the second member; and at least one mechanical flexure connected between the first member and the movable member of the actuator, where the at least one mechanical flexure constrains motion of the movable member to along a substantially straight line.

In accordance with another aspect, an example method comprises: connecting a stationary member of an electromagnetic actuator to a first member of a vacuum valve, where the first member comprises a fluid flow aperture therethrough; connecting a movable member of the electromagnetic actuator to a second member of the vacuum valve, where the second member is movably connected to the first member between an open position and a closed position relative to the fluid flow aperture; connecting at least one mechanical flexure between the first member and the movable member of the actuator, where the at least one mechanical flexure constrains motion of the movable member to along a substantially straight line, and where the electromagnetic actuator is configured to move the second member between the open position and the closed position.

In accordance with another aspect, an example method comprises: actuating an electromagnetic actuator to move a second member of a vacuum valve relative to a first member of the vacuum valve, where the first member comprising a fluid flow aperture therethrough, and where, the second member is movably connected to the first member between an open position and a closed position relative to the fluid flow aperture, where the electromagnetic actuator is configured to move the second member between the open position and the closed position, where the electromagnetic actuator comprises a stationary portion connected to the first member and a movable portion connected to the second member; and deforming a mechanical flexure as the second member is moved by the electromagnetic actuator relative to the first member, where the mechanical flexure is connected between the first member and the movable member of the actuator, and where the mechanical flexure constrains motion of the movable member to along a substantially straight line.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
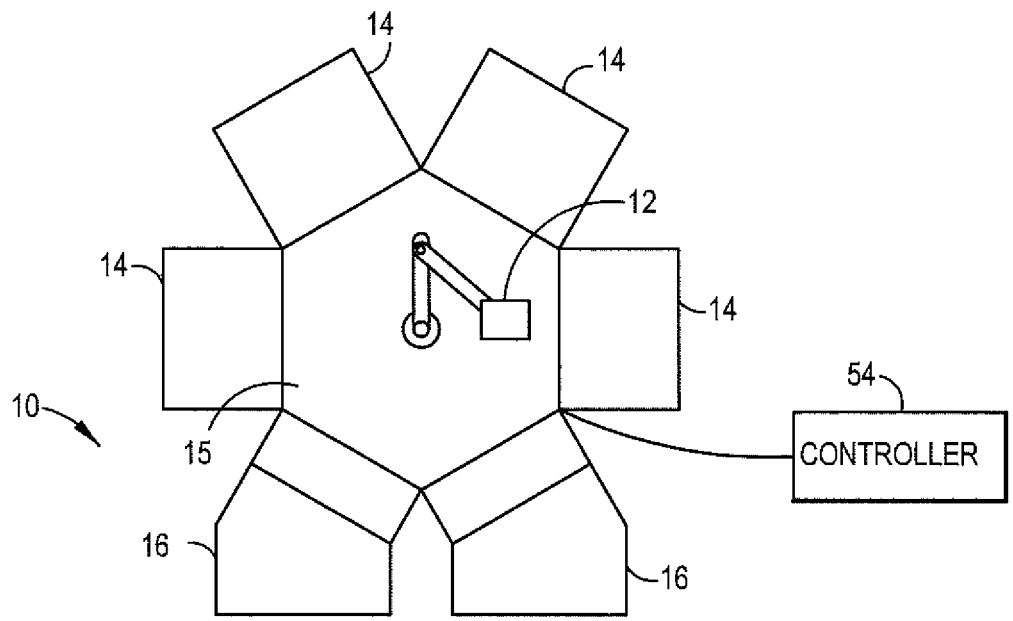
FIG. 1 is a schematic top view of an apparatus comprising a valve as described herein.

Referring to FIG. 1, there is shown a schematic top plan view of an example substrate processing apparatus 10 having a substrate transport apparatus 12. Although the present invention will be described with reference to the embodiments shown in the drawings, it should be understood that the present invention may be embodied in many forms of alternative embodiments. In addition, any suitable size, shape or type of materials or elements could be used.

The substrate processing apparatus 10, in this example, generally comprises a substrate transport apparatus 12, multiple substrate processing chambers 14 and substrate cassette elevators or load locks 16 connected to a vacuum chamber 15. The transport apparatus 12 is located, at least partially, in the chamber 15 and is adapted to transport planar substrates, such as semiconductor wafers or flat panel displays, between and/or among the chambers 14 and elevators 16. Examples of similar substrate processing apparatus 10 may be found in U.S. Pat. Nos. 9,502,952; 9,149,936; 10,224,232; and 10,269,604, which are hereby incorporated by reference in their entireties. The substrate processing apparatus 10 comprises one or more controllers 54. The controller 54 generally comprises one or more processors 56 and more or more memories 58 having software or computer code 60. The controller 54 is configured to at least partially control various aspects of the substrate processing apparatus 10 including movement of the substrate transport apparatus 12, operation of the substrate processing chambers 14, and operation of the substrate cassette elevators or load locks 16.

Figure 2:
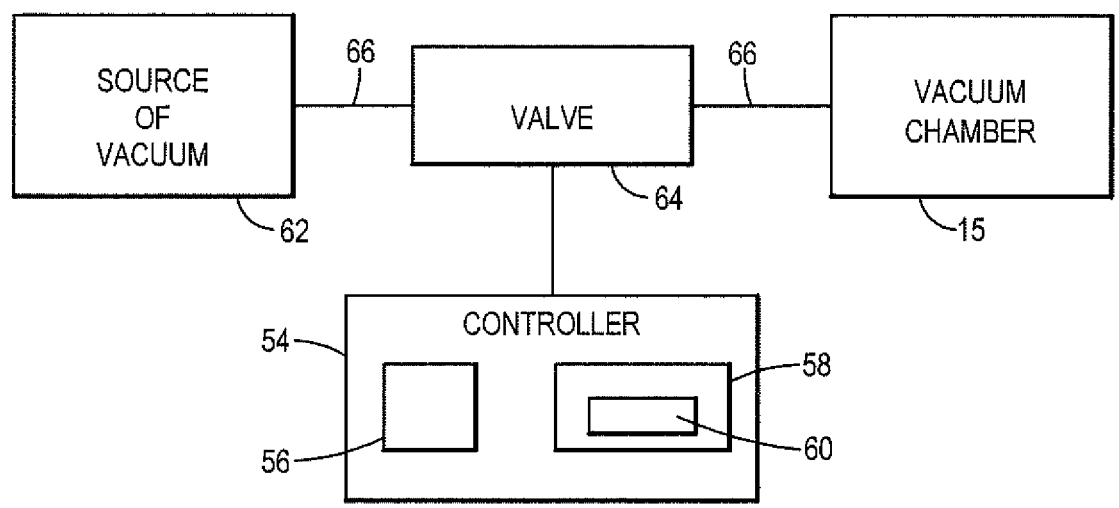
FIG. 2 is a diagram illustrating connection of the valve to other components of the apparatus shown in FIG. 1.

Referring also to FIG. 2, the atmospheric condition inside the vacuum chamber 15, in this example, is controlled with the controller 54 and the system further comprises a source of vacuum 62 and a valve 64. The source of vacuum may comprise a vacuum pump for example. The valve 64 is connected between the vacuum chamber 15 and the source of vacuum 62 via one or more conduits 66. In an alternate example, the valve 64 might be directly connected to the vacuum chamber 15 without an intermediate conduit. The valve 64 is configured to be controlled by the controller 54 where the valve 64 may be moved between an open position and a closed position. In the open position the source of vacuum 62 is coupled to the vacuum chamber 15 to create and/or maintain a vacuum condition (or pressure less than atmospheric pressure) inside the vacuum chamber 15. In the closed position the valve 64 can isolate the vacuum chamber 15 from the source of vacuum 62 and maintain the vacuum condition (or pressure less than atmospheric pressure) inside the vacuum chamber 15 without having to continuously run the source of vacuum 62. With the source of vacuum 62 off, the valve 64 may also be opened to relieve the vacuum condition inside the vacuum chamber 15, such as by letting gas into the vacuum chamber 15 for subsequent maintenance or repair for example.

Features as described herein may be used to improve on the conventional poppet valve design by eliminating complicated and expensive mechanical components, including transmission components (e.g., pulleys, belts and ball-screws), guiding components (e.g., linear bearings) and dynamic sealing components (e.g., bellows). A conventional poppet valve design is described in U.S. patent application publication No. 2017/0356569 which is hereby incorporated by reference in its entirety. The elimination of dynamic sealing components (e.g., bellows) also eliminates undesirable forces due to the pressure differential between the vacuum environment inside of the valve and the atmospheric environment outside of the valve.

Figure 3:
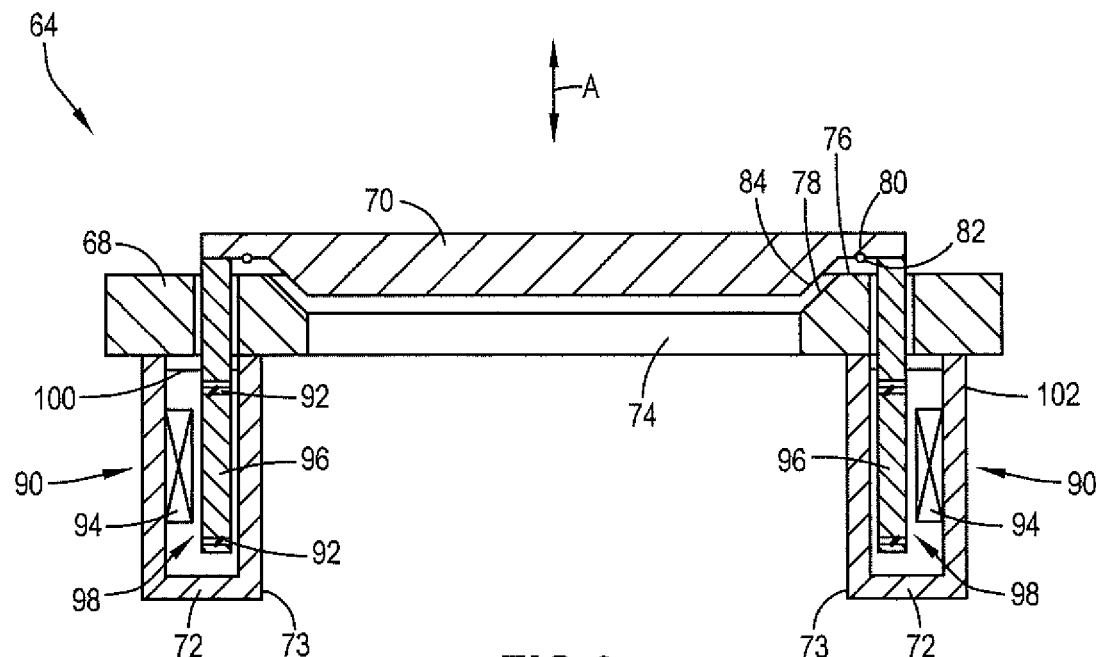
FIG. 3 is schematic sectional view of the valve shown in FIG. 2.
Figure 4:
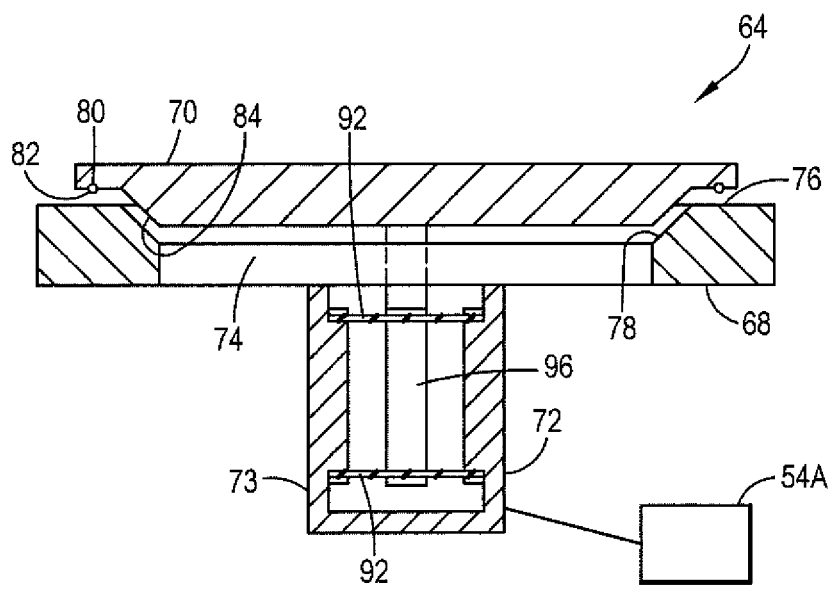
FIG. 4 is a schematic sectional view of the valve shown in FIG. 3.
Figure 5:
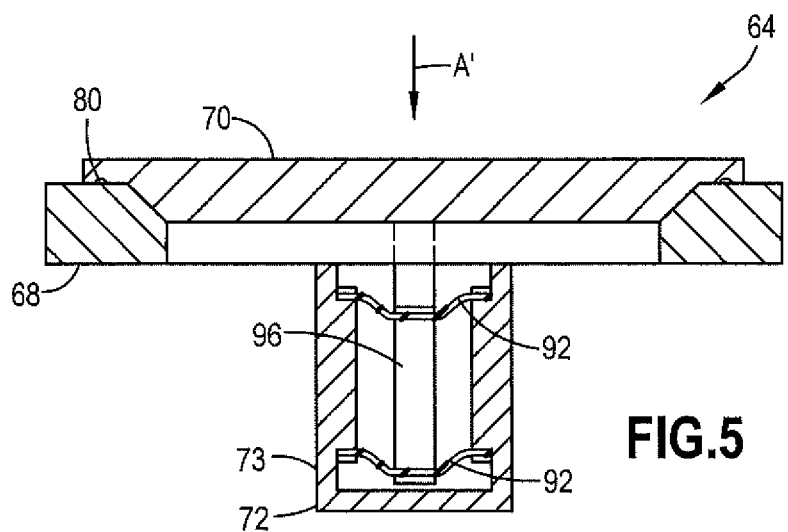
FIG. 5 is a diagram illustrating the valve in a closed position.
Figure 6:
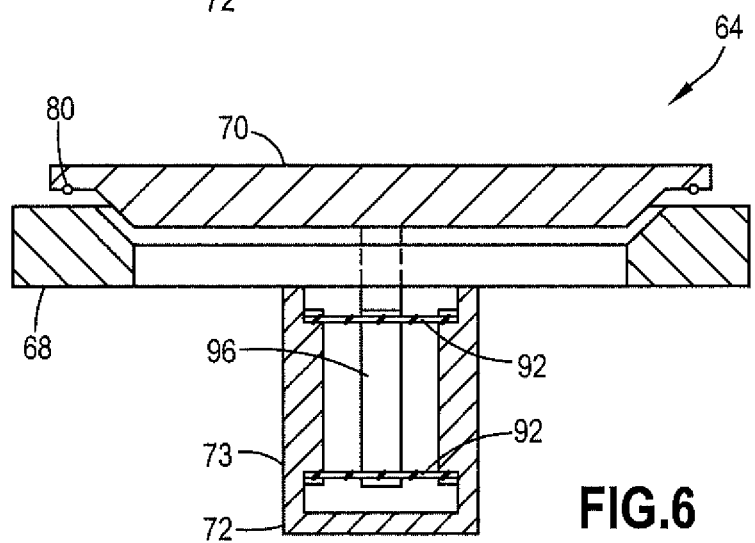
FIG. 6 is a diagram illustrating the valve in a partially open position.
Figure 7:
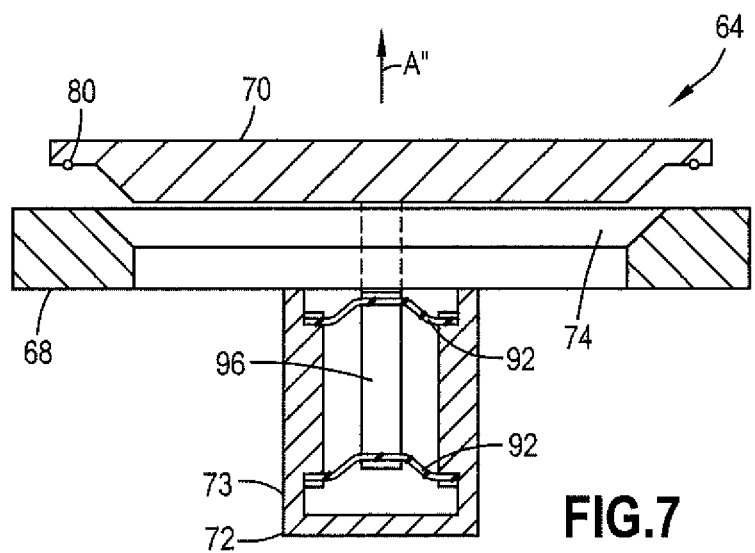
FIG. 7 is a diagram illustrating the valve in a fully open position.

An example embodiment of the vacuum control valve 64 is depicted diagrammatically in FIGS. 3-4. The top portion of the valve 64 is intended to face (and may protrude into) the vacuum process chamber 15. The bottom portion of the valve 64 is intended to interface with a vacuum pump or the source of vacuum 62, such as a turbo pump for example. When the valve 64 is fully or partially open, gas may flow in a controlled manner through the valve 64 from the vacuum process chamber 15 to the vacuum pump 62. When the valve 64 is fully closed, the process chamber 15 is isolated from the vacuum pump 62. FIGS. 5, 6 and 7 illustrate the valve 64 in a closed position, a partially open position and a fully open position, respectively.

In this example embodiment, the vacuum control valve 64 comprises a stationary portion 68 as a first member, a movable portion 70 as a second member, and at least one actuation assembly 72. In the example shown in the figures, the valve 64 comprises two of the actuation assemblies 72, one on each side of the valve.

The stationary portion 68 of the valve comprises an opening 74 and at least one flow-affecting feature, for example, the flat sealing surface 76 and/or the conical flow-control surface 78. Similarly, the movable portion 70 of the valve comprises at least one compatible flow-affecting feature, for example, the groove 80 with an O-ring seal 82 and/or the conical flow-control surface 84. The stationary portion 68 and movable portion 70 of the valve may be configured so that relative motion of the movable portion 70 with respect to the stationary portion 68 affects the flow through the opening 74 in the stationary portion 68 of the valve.

If present, the sealing features 76 and/or 78 on the stationary portion 68 and the sealing features 82 and/or 84 on the movable portion 70 of the valve may provide isolation of the environments above and below the valve when the valve is fully closed (see FIG. 5). The flow-control features 78, 84, if present, may improve fluid flow controllability near the closed position of the valve by reducing the change of the effective cross-sectional area of the valve opening as a function of the displacement of the movable portion 70 of the valve.

The actuation assembly 72, in this example, comprises a housing 73, at least one electromagnetic actuator 90 and at least one mechanical flexure 92. In the example shown, each actuation assembly 72 has two mechanical flexures 92. However, more or less that two mechanical flexures 92 may be provided. The electromagnetic actuator 90 comprises at least one stationary portion 94 and at least one movable portion 96. As an example, the actuator 90 may be a solenoid, a linear motor or any other electromagnetic actuator suitable for straight-line motion and capable of exerting force along the direction of the straight-line motion. If a linear motor, it may be, for instance, a permanent magnet brushless type (including an iron-core or coreless designs), a switched reluctance type or a stepper type. A stationary-coil or moving-coil arrangement may be used. For example, the coil may be incorporated into the stationary portion 94 of the actuator 90 or into the movable portion 96 of the actuator 90, respectively. The "air gap" 98 between the stationary portion 94 of the actuator and the movable portion 96 of the actuator may be planar, cylindrical, oval or of any suitable shape and geometry.

The stationary portion 94 of the actuator may be separated from the vacuum environment by a separation barrier 100. Alternatively, the stationary portion 94 of the actuator may be enclosed in a sealed enclosure, encapsulated in a suitable material, such as a vacuum-compatible potting material, coated by a suitable material or designed to withstand the vacuum environment and comply with any applicable outgassing requirements. Similar techniques may be applied to the moving portion 96 of the actuator so that it can withstand the vacuum environment and comply with any applicable outgassing requirements.

The mechanical flexure(s) 92 are configured to constrain the motion of the movable components of the valve along a substantially straight-line path or directions as illustrated by arrow A. As an example, this may be achieved by a flexible mechanism that allows for desirably low stiffness in the desired direction of motion while providing very high stiffness against the remaining five degrees of freedom (i.e., two directions in the plane perpendicular to the desired direction of motion and three angular orientations). In the illustrative example, a pair of simple flat flexure elements 92 is shown in each of the two actuation assemblies 72. Alternatively, more complex and compound flexure designs may be utilized to extend the range of motion. FIGS. 3, 4 and 6 show the flexures 92 at a home non-deflected position/shape. In this example, opposite ends of each flexure 92 are connected to the housing 73 of the assembly 72, and a middle portion of each flexure 92 is connected to the movable portion 96 of the actuator 90. The actuator 90 can be actuated to move the movable portion 96 inward into the housing 73 as shown by arrow A' in FIG. 5 to close the valve 64. In this closed position, the flexures 92 are deflected or deformed as shown in FIG. 5. The actuator 90 can also be actuated to move the movable portion 96 outward relative to the housing 73 as shown by arrow A" in FIG. 7 to open the valve 64 into its fully open position. In this open position, the flexures 92 are deflected or deformed as shown in FIG. 7. In alternate embodiments, the home position (non-deflected or non-deformed shape) of the flexures might not be straight. They could be the shapes shown in FIG. 5 or 7 for example. Alternatively, any suitable shape could be provided. The two flexures for each actuator assembly might also have different home shapes/positions; they need not be the same. In one example embodiment the flexure 92 comprises a flexible and resilient polymer material. In another example embodiment the flexure 92 comprises a flexible and resilient metal material. In another example embodiment the flexure 92 comprises a flexible and resilient shape memory or super-elastic material. In another example embodiment the flexure 92 comprises two or more of these materials, and/or other material(s).

The vacuum control valve 64 may also include one or more position sensors 102, connected to the controller 54, that may be configured to measure the displacement of the movable portion of the valve and/or the displacement(s) of the movable portion(s) of the actuator(s). As an example, the position sensors may be a linear position encoder type (e.g., operating on an optical, magnetic or induction principle), a linear differential variable transformer (LVDT) type or any other suitable type. The position measurements may be utilized, for instance, to control the displacement of the movable portion of the valve and/or for commutation of the actuator(s).

The vacuum control valve 64 may be connected to the controller 54 and/or further feature another controller 54A (see FIG. 4), which may be integrated into the valve or packaged externally to the valve. As an example, the controller may operate in a position control mode or a vacuum control mode. In the position control mode, the controller 54 and/or 54A may receive the desired displacement of the movable portion of the valve and the measured displacement of the movable portion of the valve, and process the information to control the actuator(s) 90 so that the measured displacement of the movable portion 70 of the valve follows closely the desired displacement of the movable portion of the valve. In the vacuum control mode, the controller 54 and/or 54A may receive information regarding the desired pressure in the vacuum process chamber 15 and the measured pressure in the vacuum process chamber 15, and process the information to control the valve 64 so that the measured pressure in the vacuum process chamber follows closely the desired pressure in the vacuum process chamber. The controller 54 and/or 54A may also be utilized to commutate the actuator(s) 90 in each actuation assembly 72 of the valve.

Although the example embodiment utilizes two actuation assemblies 72, one on each side of the valve 64, any suitable number and any suitable locations of the direct-drive flexure-mechanism actuation assemblies may be utilized. As an example, a single actuator assembly on the side of the valve, for instance, in a configuration similar to FIG. 4 in U.S. patent application publication No. 2017/0356569, may be used, or one or more actuator assemblies located centrally, e.g., in a configuration similar to U.S. Pat. No. 6,994,311, may be used.

With features as described herein, a direct-drive actuation arrangement may be provided with a bearing-less flexure-based guidance mechanism. Use of a bearing-less flexure-based guidance mechanism helps to eliminate complicated and expensive mechanical components, including transmission components (e.g., pulleys, belts and ball-screws), guiding components (e.g., linear bearings) and dynamic sealing components (e.g., bellows), while effectively addressing a potential contamination problem due to the presence of greased components (e.g., bearings) in the vacuum environment of the chamber 15. The elimination of dynamic sealing components (e.g., bellows) also eliminates undesirable forces due to the pressure differential between the vacuum environment inside of the valve and the atmospheric environment outside of the valve.

In accordance with one example embodiment, a valve may be provided comprising: a first member comprising a fluid flow aperture therethrough; a second member movably connected to the first member between an open position and a closed position relative to the fluid flow aperture; at least one electromagnetic actuator connected between the first member and the second member, where the at least one electromagnetic actuator is configured to move the second member between the open position and the closed position, where the at least one electromagnetic actuator comprises a first electromagnetic actuator comprising a stationary portion connected to the first member and a movable portion connected to the second member; and at least one mechanical flexure connected between the first member and the movable member of the actuator, where the at least one mechanical flexure constrains motion of the movable member to along a substantially straight line.

The first electromagnetic actuator may be located proximate at a first side of the second member, and where the at least one electromagnetic actuator comprises a second electromagnetic actuator at an opposite second side of the second member. The at least one mechanical flexure may comprise a first mechanical flexure proximate a bottom of the movable member and a second mechanical flexure located at an upper half of the movable member. The at least one mechanical flexure may comprise a first mechanical flexure, where the first mechanical flexure is configured to be deformed when the second member is located at the open position. The first mechanical flexure may be configured to be deformed when the second member is located at the closed position. The at least one mechanical flexure may be configured to be deformed when the second member is located at the closed position. The at least one mechanical flexure may have a substantially flat shape at a home position of the second member relative to the first member. The valve may comprise an actuator assembly housing, where the stationary portion is stationarily connected to the actuator assembly housing, where the movable portion is movably located inside the actuator assembly housing, where the at least one mechanical flexure has opposite ends connected to the actuator assembly housing and a middle portion connected to the movable member of the first electromagnetic actuator. The first member may comprise a tapered surface around an entrance into the fluid flow aperture. The second member may comprise a ring shaped tapered surface which is located in the first fluid flow aperture, against the tapered surface of the first member, when the second member is at the closed position. The valve may comprise a seal on the second member surrounding the ring shaped tapered surface, where the seal is configured to contact the first member around the entrance into the fluid flow aperture when the second member is at the closed position.

In accordance with an example method, the method may comprise: connecting a stationary member of an electromagnetic actuator to a first member of a vacuum valve, where the first member comprises a fluid flow aperture therethrough; connecting a movable member of the electromagnetic actuator to a second member of the vacuum valve, where the second member is movably connected to the first member between an open position and a closed position relative to the fluid flow aperture; connecting at least one mechanical flexure between the first member and the movable member of the actuator, where the at least one mechanical flexure constrains motion of the movable member to along a substantially straight line, and where the electromagnetic actuator is configured to move the second member between the open position and the closed position.

The first electromagnetic actuator may be located proximate at a first side of the second member, and the method further comprises connecting a second electromagnetic actuator at an opposite second side of the second member. The at least one mechanical flexure may comprise a first mechanical flexure and a second mechanical flexure, and where the method comprises connecting the first mechanical flexure proximate a bottom of the movable member and connecting the second mechanical flexure at an upper half of the movable member. The at least one mechanical flexure may comprise a first mechanical flexure, where the first mechanical flexure is connected between the first member and the movable member of the actuator and is configured such that the first mechanical flexure is deformed when the second member is located at the open position. The first mechanical flexure may be connected between the first member and the movable member of the actuator and is configured such that the first mechanical flexure is deformed when the second member is located at the closed position. The at least one mechanical flexure may be connected between the first member and the movable member of the actuator, and is configured such that the at least one mechanical flexure is deformed when the second member is located at the closed position. The at least one mechanical flexure may have a substantially flat shape at a home position of the second member relative to the first member. The valve may comprise an actuator assembly housing, where the stationary portion is stationarily connected to the actuator assembly housing, where the movable portion is movably located inside the actuator assembly housing, where the at least one mechanical flexure has opposite ends connected to the actuator assembly housing and a middle portion connected to the movable member of the first electromagnetic actuator.

In accordance with an example method, the method may comprise: actuating an electromagnetic actuator to move a second member of a vacuum valve relative to a first member of the vacuum valve, where the first member comprising a fluid flow aperture therethrough, and where the second member is movably connected to the first member between an open position and a closed position relative to the fluid flow aperture, where the electromagnetic actuator is configured to move the second member between the open position and the closed position, where the electromagnetic actuator comprises a stationary portion connected to the first member and a movable portion connected to the second member; and deforming a mechanical flexure as the second member is moved by the electromagnetic actuator relative to the first member, where the mechanical flexure is connected between the first member and the movable member of the actuator, and where the mechanical flexure constrains motion of the movable member to along a substantially straight line.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A valve comprising:
    a first member comprising a fluid flow aperture therethrough;
    a second member movably connected to the first member between an open position and a closed position relative to the fluid flow aperture;
    at least one linear solenoid actuator connected between the first member and the second member, where the at least one linear solenoid actuator is configured to move the second member between the open position and the closed position, where the at least one linear solenoid actuator comprises a first electromagnetic actuator comprising a stationary portion connected to the first member and a movable portion connected to the second member; and
    at least one mechanical flexure connected between the first member and the movable portion of the first electromagnetic actuator, where the at least one mechanical flexure constrains motion of the movable portion of the first electromagnetic actuator to along a substantially straight line, and wherein the at least one mechanical flexure is not in a flow path through the fluid flow aperture.

2. The valve as claimed in claim 1 where the first electromagnetic actuator is located proximate a first side of the second member, and where the at least one linear solenoid actuator comprises a second electromagnetic actuator at an opposite second side of the second member.

3. The valve as claimed in claim 1 where the at least one mechanical flexure comprises a first mechanical flexure proximate a bottom of the movable portion of the first electromagnetic actuator and a second mechanical flexure located at an upper half of the movable portion of the first electromagnetic actuator.

4. The valve as claimed in claim 1 where the at least one mechanical flexure comprises a first mechanical flexure, where the first mechanical flexure is configured to be deformed when the second member is located at the open position.

5. The valve as claimed in claim 4 where the first mechanical flexure is configured to be deformed when the second member is located at the closed position.

6. The valve as claimed in claim 1 where the at least one mechanical flexure is configured to be deformed when the second member is located at the closed position.

7. The valve as claimed in claim 1 where the at least one mechanical flexure has a substantially flat shape at a home position of the second member relative to the first member.

8. The valve as claimed in claim 1 where the valve comprises an actuator assembly housing, where the stationary portion is stationarily connected to the actuator assembly housing, where the movable portion of the first electromagnetic actuator is movably located inside the actuator assembly housing, where the at least one mechanical flexure has opposite ends connected to the actuator assembly housing and a middle portion connected to the movable portion of the first electromagnetic actuator.

9. The valve as claimed in claim 1 where the first member comprises a tapered surface around an entrance into the fluid flow aperture.

10. The valve as claimed in claim 9 where the second member comprises a ring shaped tapered surface which is located in the first fluid flow aperture, against the tapered surface of the first member, when the second member is at the closed position.

11. The valve as claimed in claim 10 where the valve comprises a seal on the second member surrounding the ring shaped tapered surface, where the seal is configured to contact the first member around the entrance into the fluid flow aperture when the second member is at the closed position.

12. A method comprising:
connecting a stationary member of a first linear solenoid actuator to a first member of a vacuum valve, where the first member comprises a fluid flow aperture therethrough;
connecting a movable member of the first linear solenoid actuator to a second member of the vacuum valve, where the second member is movably connected to the first member between an open position and a closed position relative to the fluid flow aperture;
connecting at least one mechanical flexure between the first member and the movable member of the first linear solenoid actuator, where the at least one mechanical flexure constrains motion of the movable member to along a substantially straight line, and where the first linear solenoid actuator is configured to move the second member between the open position and the closed position, and where the at least one mechanical flexure is not in a flow path through the fluid flow aperture.

13. The method as in claim 12 where the first linear solenoid actuator is located proximate at a first side of the second member, and the method further comprises connecting a second linear solenoid actuator at an opposite second side of the second member.

14. The method as in claim 12 where the at least one mechanical flexure comprises a first mechanical flexure and a second mechanical flexure, and where the method comprises connecting the first mechanical flexure proximate a bottom of the movable member and connecting the second mechanical flexure at an upper half of the movable member.

15. The method as in claim 12 where the at least one mechanical flexure comprises a first mechanical flexure, where the first mechanical flexure is connected between the first member and the movable member of the first linear solenoid actuator and is configured such that the first mechanical flexure is deformed when the second member is located at the open position.

16. The method as in claim 15 where the first mechanical flexure is connected between the first member and the movable member of the actuator and is configured such that the first mechanical flexure is deformed when the second member is located at the closed position.

17. The method as in claim 12 where the at least one mechanical flexure is connected between the first member and the movable member of the first linear solenoid actuator, and is configured such that the at least one mechanical flexure is deformed when the second member is located at the closed position.

18. The method as in claim 12 where the at least one mechanical flexure has a substantially flat shape at a home position of the second member relative to the first member.

19. The method as in claim 12 where the valve comprises an actuator assembly housing, where the stationary portion is stationarily connected to the actuator assembly housing, where the movable portion is movably located inside the actuator assembly housing, where the at least one mechanical flexure has opposite ends connected to the actuator assembly housing and a middle portion connected to the movable member of the first linear solenoid actuator.

20. A method comprising:
actuating a linear solenoid actuator to move a second member of a vacuum valve relative to a first member of the vacuum valve, where the first member comprises a fluid flow aperture therethrough, and where the second member is movably connected to the first member between an open position and a closed position relative to the fluid flow aperture, where the linear solenoid actuator is configured to move the second member between the open position and the closed position, where the linear solenoid actuator comprises a stationary portion connected to the first member and a movable portion connected to the second member; and deforming a mechanical flexure as the second member is moved by the linear solenoid actuator relative to the first member, where the mechanical flexure is connected between the first member and the movable portion of the actuator, and where the mechanical flexure constrains motion of the movable portion to along a substantially straight line, and where the at least one mechanical flexure is not in a flow path through the fluid flow aperture.

21. The valve as claimed in claim 1, wherein the at least one mechanical flexure constrains motion of the movable portion of the first electromagnetic actuator to along a substantially straight line with a lower degree of stiffness in a first direction of motion along the substantially straight line and a higher degree of stiffness in at least a second direction perpendicular to the first direction of motion.

* * * * *